United States Patent
Khachaturov

(10) Patent No.: US 10,594,243 B2
(45) Date of Patent: Mar. 17, 2020

(54) METHOD OF CONTROLLING SYNCHRONOUS ELECTRIC MOTOR WITH PERMANENT MAGNETS

(71) Applicant: Dmytro Khachaturov, Kharkov (UA)

(72) Inventor: Dmytro Khachaturov, Kharkov (UA)

(*) Notice: Subject to any disclaimer, the term of this patent is extended or adjusted under 35 U.S.C. 154(b) by 0 days.

(21) Appl. No.: 16/051,996

(22) Filed: Aug. 1, 2018

(65) Prior Publication Data
US 2019/0296673 A1    Sep. 26, 2019

(30) Foreign Application Priority Data

Mar. 20, 2018 (UA) .............................. A201802830

(51) Int. Cl.

| | | |
|---|---|---|
| H02K 41/00 | (2006.01) | |
| H02P 1/00 | (2006.01) | |
| H02P 3/00 | (2006.01) | |
| H02P 5/00 | (2016.01) | |
| H02P 23/30 | (2016.01) | |
| H02P 25/064 | (2016.01) | |
| E21B 43/12 | (2006.01) | |

(52) U.S. Cl.
CPC ............ *H02P 23/30* (2016.02); *E21B 43/128* (2013.01); *H02P 25/064* (2016.02)

(58) Field of Classification Search
CPC .............................. H02P 23/30; H02P 25/064
USPC ............................................ 318/400.02, 135
See application file for complete search history.

(56) References Cited

U.S. PATENT DOCUMENTS

| | | | | |
|---|---|---|---|---|
| 4,370,098 A | * | 1/1983 | McClain | F04B 49/065 417/18 |
| 6,392,418 B1 | * | 5/2002 | Mir | B62D 5/046 318/716 |
| 2017/0141712 A1 | * | 5/2017 | Royak | H02P 27/06 |
| 2018/0138849 A1 | * | 5/2018 | Royak | H02P 23/26 |

* cited by examiner

*Primary Examiner* — Erick D Glass
(74) *Attorney, Agent, or Firm* — Nadya Reingand; Yan Hankin

(57) ABSTRACT

An invention relates to synchronous electric motors, in particular, to a method of controlling a synchronous electric motor with permanent magnets, utilized as a linear drive for an electric submersible pump unit. A technical result achieved from a method embodiment consists in increasing an accuracy of a torque control of the electric motor and improving an energy efficiency of the electric motor, as well as in achieving an increase in an operation speed of control systems by minimizing settings and eliminating complex calculations of motor parameters. An essence of the claimed method consists in an implementation of an algorithm of the control system of the synchronous electric motor with permanent magnets, utilized, in particular, as a linear drive for an electric submersible pump unit.

3 Claims, 2 Drawing Sheets

METHOD OF CONTROLLING SYNCHRONOUS ELECTRIC MOTOR WITH PERMANENT MAGNETS

CROSS-REFERENCES TO RELATED APPLICATIONS

The present patent application claims priority to Ukrainian patent application a201802830 filed Mar. 20, 2018.

FIELD OF INVENTION

An invention relates to synchronous electric motors, in particular, to a method of controlling a synchronous electric motor with permanent magnets, utilized as a linear drive for an electric submersible pump unit.

BACKGROUND

The synchronous motors (hereinafter referred to as SM) with permanent magnets have a variety of advantages, which allows to distinguish them among all other electrical machines. In particular, a stability of a maintained speed constitutes one of the advantages, which is a paramount requirement for various technological processes, among which, a production of stratum fluids by means of the electric submersible pump units.

The electric submersible pump units, purposed for production of borehole fluids, comprising actuation from the synchronous electric motor of a rotational or progressive action, are currently very common.

A control principle of the mentioned SM is based on an implementation of a vector control of a torque of a moving part of the electric motor, performed by means of an intelligent system of controlling sources of alternate current or voltage, usually by implementing pulse width modulation (hereinafter referred to as PWM).

Various vector control methods have been implemented in the literature and in practice, most of them are based on determining values of a position of an angle of the SM rotor, providing a distinction for a control comprising utilization of rotor position sensors and a sensorless control.

Hall sensors integrated into the electric motor are usually utilized as sensors of the rotor position, which allows to determine the angle with an accuracy of ±30 degrees. Such a control provides a certain number of positions taken by a current vector of a stator for one electrical period, as a result the torque pulsations occur at an output.

The sensorless control is based on utilization of observer units, tracking a back electromotive force (hereinafter referred to as EMF) during a rotation of the motor. However, this system is ineffective at low speeds of the motor, when the back EMF has a low amplitude, that is difficult to distinguish it from a noise interference, therefore this method is not suitable for determining the position of the motor rotor at low speeds.

A common disadvantage of all the SM vector control systems under consideration is a low operation speed of torque control, associated with a presence of an inertia torque of the motor rotation.

A direct torque control (hereinafter referred to as DTC) constitutes an alternative to vector control, while a selection of a corresponding voltage vector depending on a vector position of the rotor magnetic flux and on a difference between a given and an actual operating torque is the main principle of the DTC. The direct torque control has such advantages as aimed rate of torque change response and a high electromagnetic torque at low speeds. However, the operation of the DTC electric drive is accompanied by high pulsations of the electromagnetic torque, especially at low speeds, and an implementation of this method requires significant computational operations, which inhibits a control speed to some extent.

Application for an invention US 20170126160 dated Apr. 5, 2017 sets out a method for controlling a synchronous electric motor with permanent magnets, that comprises measuring output currents supplied to the motor, converting them into Id, Iq currents within d-q rotating coordinate system, determining a required Ud voltage depending on a difference between the measured Id current and the set Id value. Also this method comprises determining a required Uq voltage depending on a difference between a measured Iq current and a set Iq value, determining an angle of an inverter depending on the required Ud voltage and the required Uq voltage, determining the required voltage on a bus of a communication with the motor depending on the required Ud voltage and the required Uq voltage, determining a converter switching angle depending on a difference between a required bus voltage and a measured bus voltage, controlling the converter of the electric drive depending on the converter switching angle, creating the required voltage on the DC bus linked between the converter and the inverter of the electric drive and, consequently, controlling an operation of the inverter depending on the angle of the inverter and forming a six-pulse output signal in a form of a voltage applied to the motor without using a pulse-width modulation.

The described method is based on the sensorless determination of the rotor position, conducted by means of the observer unit, which leads to the above mentioned disadvantages associated with its operation. Also, it is commonly known that, the absence of the pulse-width modulation allows to avoid utilization of output voltage filters, but at the same time leads to a significant decrease in an energy efficiency of the system.

SUMMARY

The claimed invention aims solving a technical problem constituting an implementation of the method of controlling the synchronous motor, allowing to increase its energy efficiency, while providing an optimal speed and accuracy of control over a wide frequency range.

The technical result achieved from the method embodiment consists in increasing the accuracy of torque control of the electric motor and improving the energy efficiency of the electric motor, as well as in achieving an increase in the operation speed of the control systems by minimizing settings and eliminating complex calculations of motor parameters.

An essence of the claimed method consists in an implementation of an algorithm of the control system of the synchronous electric motor with permanent magnets. The described method comprises determining changes of Iq reactive current with respect to $Iq_{zad}$ setting, according to which correction signals of the Uq and Ud voltage are generated, that lead to the values necessary to form the set $Iq_{zad}$ value of the reactive current.

A preferred embodiment of the method comprises generating of the Ud voltage signal value taking into account $Uq_{oc}$ return signal from the proportional-and-integral (hereinafter referred to as PI) Iq current controller and the $Uq_{zad}$ setting, formed on the basis of characteristics of the controlled electric motor.

Also, according to the preferred embodiment of the method the $Iq_{zad}$ signal is set to zero, while generating a specification for the proportional-and-integral controller of the Iq current, providing that the $Uq_{zad}$ specified signal for the proportional-and-integral controller of the Iq current is generated from a value of an angle between an output phase voltage and a phase current, as well as $U_{HOM}$ nominal voltage value of the controlled motor.

BRIEF DESCRIPTION OF THE DRAWINGS

The essence of the claimed invention is explained, but is not limited to the following drawings:

DETAILED DESCRIPTION OF THE PREFERRED EMBODIMENT

The described method can be implemented in control systems of the synchronous electric motors of various purposes and designs.

Figure 1:
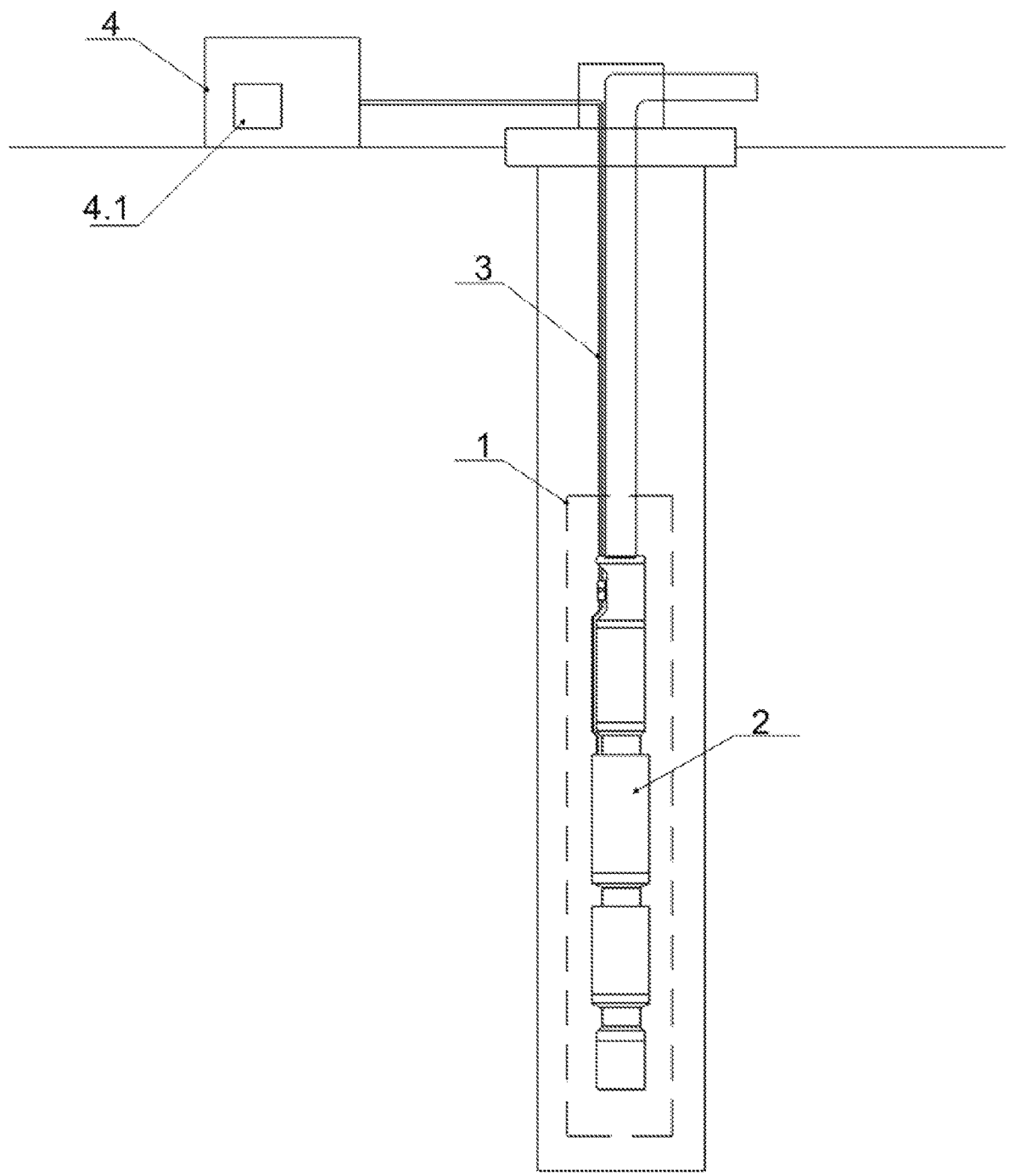
FIG. 1 shows a diagram of a linear electric submersible pump unit.

An example of a control system of synchronous electric motors with permanent magnets of linear electric submersible pump unit 1 is shown schematically on FIG. 1 as one of the embodiments of the claimed methods and contains submersible linear electric motor 2 (FIG. 1, 2) with permanent magnets, connected with cable line 3 to surface control unit 4 which includes control device 4.1.

Figure 2:
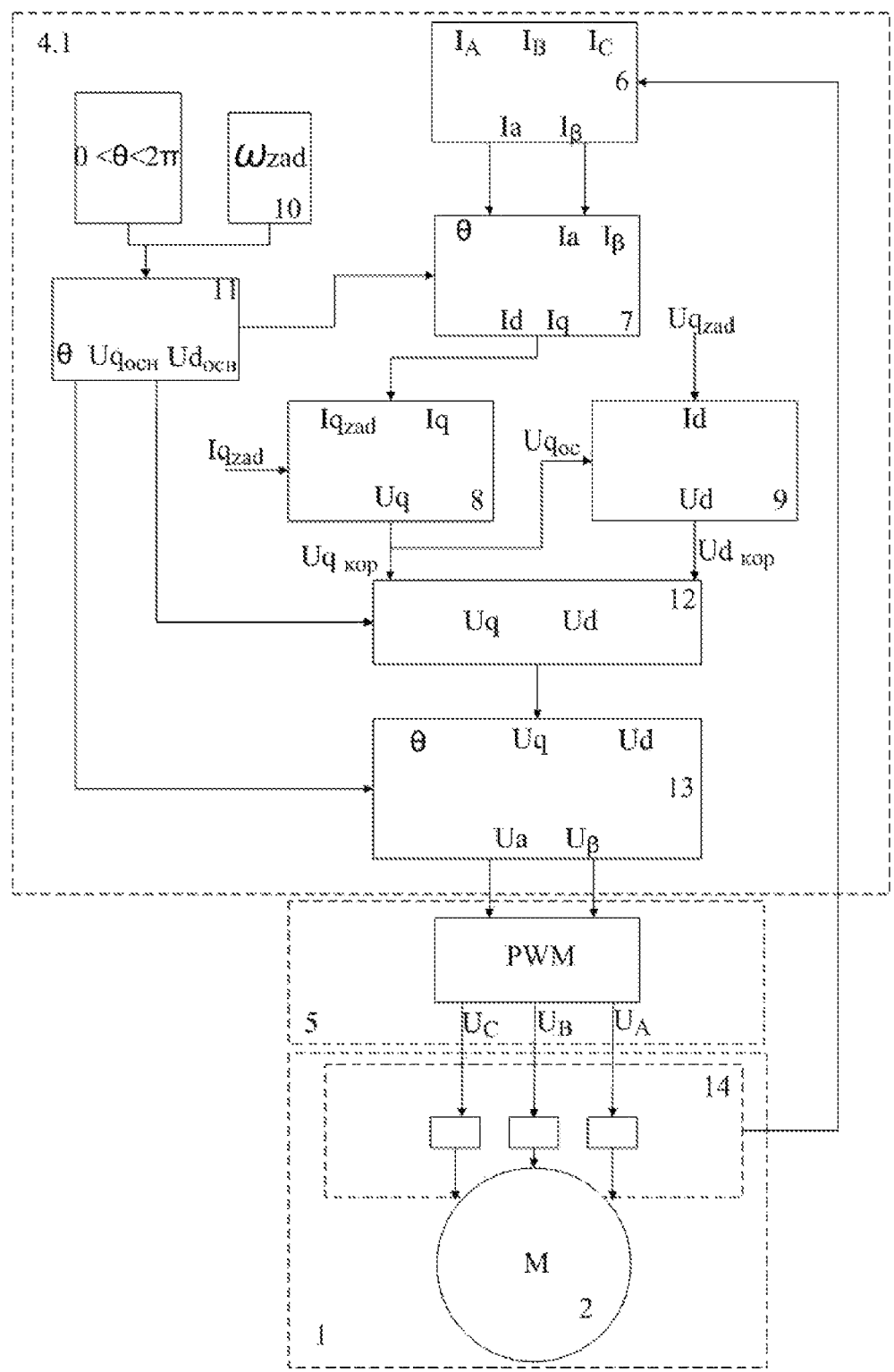
FIG. 2 shows a control-flow chart of controlling the synchronous electric motor with permanent magnets.

The control system of the electric motor is implemented by software-based methods of controlling power sources 5 of $U_A$, $U_B$, $U_C$ voltage (FIG. 2), such as IGBT transistors. Said control system, connected to control device 4.1, comprises $I_A$, $I_B$, $I_C$ phase current conversion block 6; Iα, Iβ to Id, Iq current conversion block 7; PI regulators of Iq current 8 and Id current 9 generating the Uq, Ud voltages; block 10 setting $\omega_{zad}$ speed; block 11 generating θ angle signals and main $Uq_{OCH}$, $Ud_{OCH}$ voltage signals; block 12 generating $Uq._{KOP}$, $Ud_{KOP}$ correction signals; block 13 of conversion Ud, Uq to Uα, Uβ voltages; current sensors 14.

The claimed method involves generating setting for the voltage $\omega_{zad}$ circular frequency within block 10 at the moment of a start of the linear electric motor. The main Uq, Ud voltage signals are generated and the θ angle of a permissible deviation of a magnetic field of the stator from a magnetic field of a movable part is determined within block 11 on the basis of the set value of the $\omega_{zad}$ circular frequency, while the θ angle is limited within a range of 0 to 2π.

In the next stage, the Ud voltage value are determined by means of the $U_{HOM}$ nominal voltage values and PI controller 9 of the Id current, taking into account the $Uq_{oc}$ return signal from PI controller 8 of the set $Uq_{zad}$ value, generated on the basis of the controlled electric motor parameters, containing values of the angle between the output phase voltage and the phase current.

Next, the main signals of the $Uq_{OCH}$, $Ud_{OCH}$ voltages and the signal with the θ angle value, corrected in block 12 considering with Ud, Uq signals formed by blocks 8, 9, are supplied from block 11 to Ud, Uq to Uα, Uβ voltage conversion block 13. The Uα, Uβ voltage signals resulting from the conversion are applied to Uα, Uβ to $U_A$, $U_B$, $U_C$ voltage conversion block. The received $U_A$, $U_B$, $U_C$ phase voltage signals constitute the setting for controllable voltage sources 5, in which the phase voltage signals are generated by means of pulse width modulation (PWM), while the mentioned signals supply the linear electric motor of the pump unit, thereby provide a progressive motion to its movable part.

Next, the $I_A$, $I_B$, $I_C$ phase currents begin to flow through stator windings with the progressive motion of the movable part of the linear motor, while the mentioned phase currents are recorded in sensor block 14 at every instant.

The received signals from the $I_A$, $I_B$, $I_C$ phase current fixation sensors are supplied to the phase current conversion block 6, where they are converted into a stationary α-β coordinate system. The converted signals are fed to block 7 of transforming the coordinates α-β to d-q and generating the Id, Iq signals, taking into account the θ angle.

The Iq signal is used as a feedback in the PI regulator 8 of Iq current, where it is subtracted from the generated $Iq_{zad}$ (standard reactive current) signal, which is set to zero. The said PI controller is connected operatively with the control device 4.1, due to which the $Iq_{zad}$ (standard reactive current), $Uq_{zad}$ (standard voltage value) are set, as well as the $\omega_{zad}$ circular frequency value.

The $Uq_{KOP}$, $Ud_{KOP}$ signals, received at an output of blocks 8, 9, are fed to block 12 in order to perform correction of the $Uq_{OCH}$, $Ud_{OCH}$ main voltage. The signals corrected in block 12 serve as the setting for the Ud, Uq to Uα, Uβ voltage generation and transformation blocks.

Consequently, an adjustment of the Iq reactive current is performed during the operation of the linear submersible electric motor with permanent magnets. In addition, an adjustment of the Id active current is performed, while obtaining the Ud, Uq voltage signals at the output of the PI regulators 8, 9, which provides the necessary correction of the $Ud_{OCH}$, $Uq_{OCH}$ main voltage signals, generated in block 11, thereby enabling the direct control of the electric motor torque.

Herewith, the position of the stator magnetic field is determined relatively to the magnetic field of the moving part of the electric motor at every instant by measuring the phase current signals with their subsequent conversion in blocks 6, 7, 8, 9, while determining the changes in the Iq reactive current relatively to the $Iq_{zad}$ setting, according to which the $Uq_{KOP}$, $Ud_{KOP}$ voltage correction signals are formed, which lead to the values necessary to form the set value of the $Iq_{zad}$ reactive current.

The described control method allows to increase and decrease rapidly the voltages and the currents of the SM under load surges and reliefs.

The implementation of the claimed invention contributes to the achievement of the claimed technical result, providing the increase in the energy efficiency of the electric motor, as well as improving the operational speed of the control system by minimizing the settings and eliminating the complex calculations of the electric motor parameters. This method can be used to control various types of electric motors, taking into account the change in the setting signals of the PI regulators.

What is claimed is:

1. A method for controlling a synchronous electric motor with permanent magnets, comprising:
   connecting via a cable line the electric motor with a surface control unit, said surface control unit including a control device,
   defining values characterizing applied voltage and phase via the control device;
   measuring phase currents of a stator winding of the electric motor via current sensors and converting obtained current values into a d-q fixed reference system, wherein said obtained current values are measured for every instance of a moving part of the electric motor, the surface control unit forming signals of Ud, Uq voltage from the obtained current values, the surface control unit forming signals for setting $U_A$, $U_B$, and $U_C$ phase voltages by converting Ud, Uq voltage signals into Uα, Uβ, wherein the control device performs said converting, supplying the signals for setting $U_A$, $U_B$, and $U_C$ phase voltages a pulse generating unit of the surface control unit, detecting a reactive current value, Iq, and a voltage value, Uq, via the control device, setting a standard reactive current value and a standard voltage value via the control device, defining alterations of the reactive current value relative to the standard reactive current value via the surface control unit, generating correction signals for voltage according to the defined alterations via the surface control unit, and the surface control unit transmitting the correction signals for voltage to the control device, said control device being in communication with the electric motor, thereby enabling a direct control of the electric motor's torque.

2. The method of claim 1, wherein the control device generates the correction signals taking into account:
   a return voltage signal from a proportional-and-integral controller of the Iq current, and
   a specification of the reactive voltage value, said specification being formed on a basis of parameters of the controlled synchronous electric motor.

3. The method of claim 2, wherein the control device sets the alterations to reactive current signal to zero when generating a specification for the proportional-and-integral controller provided that the voltage signal from the proportional-and-integral controller is generated based on:
   a value of an angle between an output phase voltage and a phase current of the stator winding, and
   a nominal voltage value of the electric motor.

* * * * *